United States Patent [19]

Nies et al.

[11] 3,860,692

[45] Jan. 14, 1975

[54] SODIUM ALUMINUM BORATE

[75] Inventors: Nelson P. Nies, Laguna Beach;
Richard W. Hulbert, Anaheim, both of Calif.

[73] Assignee: United States Borax & Chemical Corporation, Los Angeles, Calif.

[22] Filed: Mar. 27, 1972

[21] Appl. No.: 238,638

[52] U.S. Cl. .............................. 423/277, 252/8.1
[51] Int. Cl. .............................................. C01b 35/00
[58] Field of Search .......... 423/279, 280, 281, 276, 423/277, 115; 252/8.1, 432

[56] References Cited
UNITED STATES PATENTS

| | | | |
|---|---|---|---|
| 1,350,090 | 8/1920 | Wrinkle et al. | 423/280 |
| 1,812,347 | 6/1931 | Kuhnert | 423/280 |
| 1,813,478 | 7/1931 | Andrussow et al. | 252/432 |
| 3,094,378 | 6/1963 | Wolff | 423/119 X |
| 3,126,352 | 3/1964 | Blair | 423/280 |
| 3,202,570 | 8/1965 | Videen | 252/8.1 X |
| 3,385,819 | 5/1968 | Gouinlock | 252/8.1 |
| 3,649,172 | 3/1972 | Nies et al. | 423/280 |

OTHER PUBLICATIONS

Mellor, "Comprehensive Treatise on Inorganic & Theoretical Chemistry" Vol. 5, Longmans, Green & Co., N.Y., 1924, pgs. 102–3, 288.
Mushran, "Aluminum Borate Gel" Chemical Abstracts, Vol. 41, 1947, 1910h.
Jacobson, Ed. Encyclopedia of Chemical Reactions, Reinhold Co., N.Y., N.Y., 1946, pg. 171, I-643.
Adams, Ed. Boron, Metallo–Boron Compounds & Boranes; III-Nies, et al., "Inorganic Boron–Oxygen Chemistry" Interscience, N.Y., N.Y., pgs. 100, 129, 135, 142–3.
Kesans et al., "Potassium Barium Octoborate" Latvijas PSR Zinatnu Akad., Vestis, 1954, No. 5 (whole No. 82) 105; Chem. Abstr. 48 11969 (1954).
Adams, Ed., "Boron, Metallo–Boron Compounds & Boranes" Interscience Publishers, N.Y., N.Y., (1964) pp. 29, 30.

*Primary Examiner*—Oscar G. Vertiz
*Assistant Examiner*—Brian E. Hearn
*Attorney, Agent, or Firm*—James R. Thornton

[57] ABSTRACT

Crystalline sodium aluminum borate which can be prepared by reaction of sodium tetraborate with aluminum hydroxide or aluminum salts in water at an elevated temperature. The product is useful as a fire-retardant for polyesters.

7 Claims, No Drawings

SODIUM ALUMINUM BORATE

This invention relates to inorganic borate compounds and more specifically to a novel crystalline sodium aluminum borate.

Sodium borates such as sodium tetraborate and sodium metaborate are well known, and the preparation of aluminum borate has been reported; however, the preparation of a crystalline sodium aluminum borate has not been disclosed by the art.

The present invention provides a new crystalline sodium aluminum borate which has the approximate formula $2Na_2O \cdot Al_2O_3 \cdot 6B_2O_3$. The new compound is a definite crystalline material which finds use as a fire retardant in polyester compositions. The sodium aluminum borate crystals are formed in the presence of an aqueous medium and contain approximately 13 moles of water of hydration. However, upon heating at elevated temperatures, such as around 100°–130°C., the material can be dehydrated to a water content of about 5 moles.

The crystalline compound of this invention is readily prepared by reaction of sodium tetraborate ($Na_2B_4O_7$) with a water soluble aluminum salt, such as aluminum sulfate, aluminum chloride, aluminum nitrate, and sodium aluminate or an amorphous aluminum hydroxide, at an elevated temperature, such as at least about 45°C. and preferably at least about 60°C. Water is a preferred reaction medium since the product will readily crystallize from a hot aqueous solution. The sodium tetraborate reactant is preferably sodium tetraborate decahydrate (borax) or the pentahydrate and should be at a concentration of at least about 20% $Na_2B_4O_7$ in the aqueous solution. A boron to aluminum mole ratio of about 10:1 to about 40:1 is generally suitable in the reaction mixture. If sodium aluminate or aluminum hydroxide is used as the source of aluminum, boric acid should be added to the reaction mixture to make it less alkaline. Generally an amount of boric acid corresponding to about 50 to 100% of the amount of $Na_2B_4O_7$ in the reaction mixture is sufficient. The desired product is crystallized from the aqueous reaction medium and is isolated by conventional procedures, such as by filtration from the hot solution.

The following examples illustrate preparation of the novel compound of this invention:

EXAMPLE I

To a hot solution of 1450 g. of sodium tetraborate decahydrate in 1500 g. of water was added 200 g. of aluminum sulfate [$Al_2(SO_4)_3 \cdot 18H_2O$] at 100°C. over a period of about 10 minutes. After about 2 hours, rod-shaped crystals ranging from about 1 to 25 microns in size began forming. After stirring for an additional 3 hours at 100°C., the slurry was filtered and the crystalline precipitate was washed with cold water and then with acetone. The crystalline product was allowed to dry overnight to give 116 g. of fluffy white powder. Analysis of the material gave the following results:

14.04% $Na_2O$; 13.03% $Al_2O_3$; 47.23% $B_2O_3$; 25.70% $H_2O$ (by difference)

which corresponds to the formula $2.00Na_2O \cdot 1.13Al_2O_3 \cdot 6B_2O_3 \cdot 12.61H_2O$. The product had the following X-ray diffraction pattern:

| d,A | I/I$_1$ |
| --- | --- |
| 12.42 | 14 |
| 11.55 | 100 |
| 11.12 | 25 |
| 9.88 | 20 |
| 7.22 | 6 |
| 5.81 | 18 |

When the reaction is run at temperatures below about 45°C., an amorphous material containing essentially no sodium is obtained.

A portion of the product was dried in an oven at 130°–133°C. for three days. A weight loss of 15.93%, correspond to 7.8 moles of water, resulted in a product having the composition $2.00Na_2O \cdot 1.13Al_2O_3 \cdot 6B_2O_3 \cdot 4.8H_2O$. The principal lines in the X-ray diffraction pattern were as follows:

| d,A | I/I$_1$ |
| --- | --- |
| 11.4 – 11.7 | 22 |
| 10.6 | 100 |
| 9.5 | 25 |
| 9.2 | 22 |
| 7.2 | 8 |
| 7.05 | 8 |

EXAMPLE II

To a hot solution of 955g. of borax in 1500 g. of water was added 37.8 g. of sodium aluminate powder (approximately 65% $NaAlO_2$ with 15–20% NaOH) while maintaining the solution at 95°C. Boric acid (169.5 g.) was added to the solution and then, after 3 minutes, an additional 37.8 g. of sodium aluminate powder and 169.5 g. of boric acid were added. The resultant slurry was stirred at 95°C. for three days and then filtered, washed with cold water and then with acetone. After drying in air, the crystalline solid (121 g.) was analyzed and the following results obtained:

13.95% $Na_2O$; 12.81% $Al_2O_3$; 46.44% $B_2O_3$; 26.80% $H_2O$ (by difference)

which corresponds to the formula $2.02Na_2O \cdot 1.13Al_2O_3 \cdot 6B_2O_3 \cdot 13.38H_2O$. The X-ray diffraction pattern of the product was identical to that of the product obtained in Example I.

EXAMPLE III

To 721 grams of sodium tetraborate decahydrate dissolved in 721 grams of water at 98°C. was added 129 grams of $Al(NO_3)_2 \cdot 9H_2O$. A small amount (0.1 g.) of previously prepared sodium aluminum borate seed crystals was added and the mixture stirred overnight at 95°C. The resultant slurry of small, rodlike crystals was filtered. The resultant crystals were washed with water, then acetone and dried in air. A yield of 104 g. of product was obtained having the same X-ray pattern as the product of Example I.

EXAMPLE IV

The procedure of Example III was followed using 141 g. aluminum chloride as the aluminum salt and 1000 g. of borax in 1000 ml. $H_2O$. The crystalline product (130 g.) was identified by X-ray pattern as $2Na_2O \cdot Al_2O_3 \cdot 6B_2O_3 \cdot 13H_2O$.

EXAMPLE V

To 1000 g. of sodium tetraborate decahydrate in 1000 g. of water (95°C.) was added 97 g. of amorphous aluminum hydroxide and 265 g. of boric acid. A small amount of seed crystals was added and the resultant mixture stirred for three days at 95°C. The desired product was obtained as rod-shaped crystals in a 286 g. yield.

The sodium aluminum borate of the present invention is useful as a fire retardant additive for polyester resins containing halogen. For example, the addition of from about 3 to 20% or more of the sodium aluminum borate to polyester resins containing chlorine or bromine results in a highly fire retardant polymer composition. The following example sets forth a typical preparation of a polyester laminate containing the sodium aluminum borate of the present invention.

EXAMPLE VI

A quantity of the resin (700 g.) is placed in a container such as uncoated paper tub. The resin is stirred with an electric mixer and if it does not contain a promoter, a cobalt compound, such as cobaltous naphthenate or cobalt oleate is used. The amount of promoter is dependent upon the rate of cure desired, generally about 0.5 to about 1.0 ppm of the cobalt compound being added. After the cobalt promoter is thoroughly mixed into the resin, the sodium aluminum borate 5-hydrate was added in an amount corresponding to 5% by weight of the mixture. After the solids have been thoroughly mixed into the resin, a catalyst such as methyl ethyl ketone peroxide is added; for a fairly rapid cure, about 0.8 ppm of the peroxide is added to 700 g. of the resin. At room temperature, the polymer begins to cure in about 20 minutes. Once the catalyst has been stirred into the resin, it is immediately used in the lay-up to prepare laminated test panels.

Hetron 92, a polyester resin containing about 28% chlorine, and Dion 6692, a polyester resin containing about 22% bromine, were used in the tests.

The following describes the lay-up procedure and the radiant panel test to determine the fire retardancy of the polyester panels.

Layup. A flat piece of plywood of ¾-inch thickness is used as a support. A layer of Mylar film is placed on the plywood support and on this are placed two 20 oz. Fiberglas matts. An extremely thin matt of Fiberglas material (veil) is placed on top of the matts and the resin mixture then applied to this composite and worked into the Fiberglas. A second sheet of Mylar film is placed on the matt and the matt worked and rolled with a roller until smooth. Weight is then applied to the matt by use of a second piece of plywood, and the matt allowed to cure for several hours. After the initial cure, the Mylar film is removed and the specimen panels cut for curing. The panels are cured at about 200°F. for 2 hours to give Fiberglas panels which, after cutting to size, are then ready for fire testing.

Radiant Panel Test

The radiant panel test (ASTM E162-1962) which was developed by the National Bureau of Standards is a relativly simple method for measuring the surface flammability of materials. The equipment includes a 12 by 18-in. radiant heat panel, a specimen holder, a gas pilot, a stack, and proper instrumentation to assure reproducible test conditions. The radiant panel is mounted in a vertical position and supplied with a premixed gas-air mixture. Its energy output is maintained constant by a radiation pyrometer. The holder supports a 6 by 18-in. specimen in an inclined position so that the top 6-in. edge of the specimen is 4½ in. and the bottom edge 9⅝ in. from the radiant panel. The gas pilot is located near the top edge of the specimen. The stack, which is located above the specimen, collects heat and products of combustion from the burning specimen and supports the thermocouples for measuring the gas temperatures.

During typical tests, the specimen is exposed to the radiant panel for 15 minutes. When sufficiently heated, it is ignited by the gas pilot. The rate of flame movement down the panel is recorded along with stack temperatures.

The test results reported are a flame spread index which is calculated from the time intervals the flame front arrived at 3-in. positions along the length of the specimen, the maximum observed stack temperature rise above that observed when testing asbestos-cement board, and a constant arbitrarily chosen to yield a flame spread index of approximately 100 for red oak. The index is computed in this manner to recognize both the ignition and heat evolution characteristics of the material being tested. A low flame spread index denotes a high degree of fire retardancy.

The following results were obtained:

TABLE I

| Resin Composition | Flame Spread Index |
| --- | --- |
| Hetron 92 | 16.5 |
| Hetron 92 + 5% sodium aluminum borate | 7 |
| Dion 6692 | 36 |
| Dion 6692 + 5% sodium aluminum borate | 18 |

Various changes and modifications of the invention can be made and, to the extent that such variations incorporate the spirit of this invention, they are intended to be included within the scope of the appended claims.

What is claimed is:

1. Crystalline hydrated sodium aluminum borate of the approximate formula $2Na_2O \cdot Al_2O_3 \cdot 6B_2O_3 \cdot 13H_2O$ having the following principal lines in its X-ray diffraction pattern:

| d,A | I/I$_1$ |
| --- | --- |
| 12.42 | 14 |
| 11.55 | 100 |
| 11.12 | 25 |
| 9.88 | 20 |
| 7.22 | 6 |
| 5.81 | 18. |

2. Crystalline hydrated sodium aluminum borate of the approximate formula $2Na_2O \cdot Al_2O_3 \cdot 6B_2O_3 \cdot 5H_2O$ having the following principal lines in its X-ray diffraction pattern:

| d,A | I/I$_1$ |
| --- | --- |
| 11.4–11.7 | 22 |

-Continued

| d,A | I/I₁ |
|---|---|
| 10.6 | 100 |
| 9.5 | 25 |
| 9.2 | 22 |
| 7.2 | 8 |
| 7.05 | 8. |

3. The method for producing crystalline sodium aluminum borate of the approximate formula $2Na_2O \cdot Al_2O_3 \cdot 6B_2O_3 \cdot 13H_2O$ which comprises reacting sodium tetraborate with a water-soluble aluminum salt or amorphous aluminum hydroxide in an aqueous medium at an elevated temperature of at least about 45°C., the boron to aluminum mole ratio in the reaction mixture being about 10:1 to about 40:1.

4. The method in accordance with claim 3 in which said elevated temperature is at least about 60°C.

5. The method in accordance with claim 3 in which an aqueous solution of sodium tetraborate containing at least 20% $Na_2B_4O_7$ is reacted with aluminum sulfate at a temperature of at least about 60°C., the molar ratio of boron to aluminum in said reaction mixture being in the range of about 10:1 to about 40:1

6. The method in accordance with claim 3 in which said water-soluble aluminum salt is selected from the group consisting of aluminum sulfate, aluminum chloride, aluminum nitrate and sodium aluminate, boric acid also being present when said aluminum salt is sodium aluminate.

7. The method in accordance with claim 3 in which sodium tetraborate is reacted with amorphous aluminum hydroxide in the presence of boric acid.

* * * * *